April 17, 1945.  H. A. McMASTER ET AL  2,374,027
REAR VISION OPTICAL INSTRUMENT
Filed Dec. 26, 1941  4 Sheets-Sheet 1
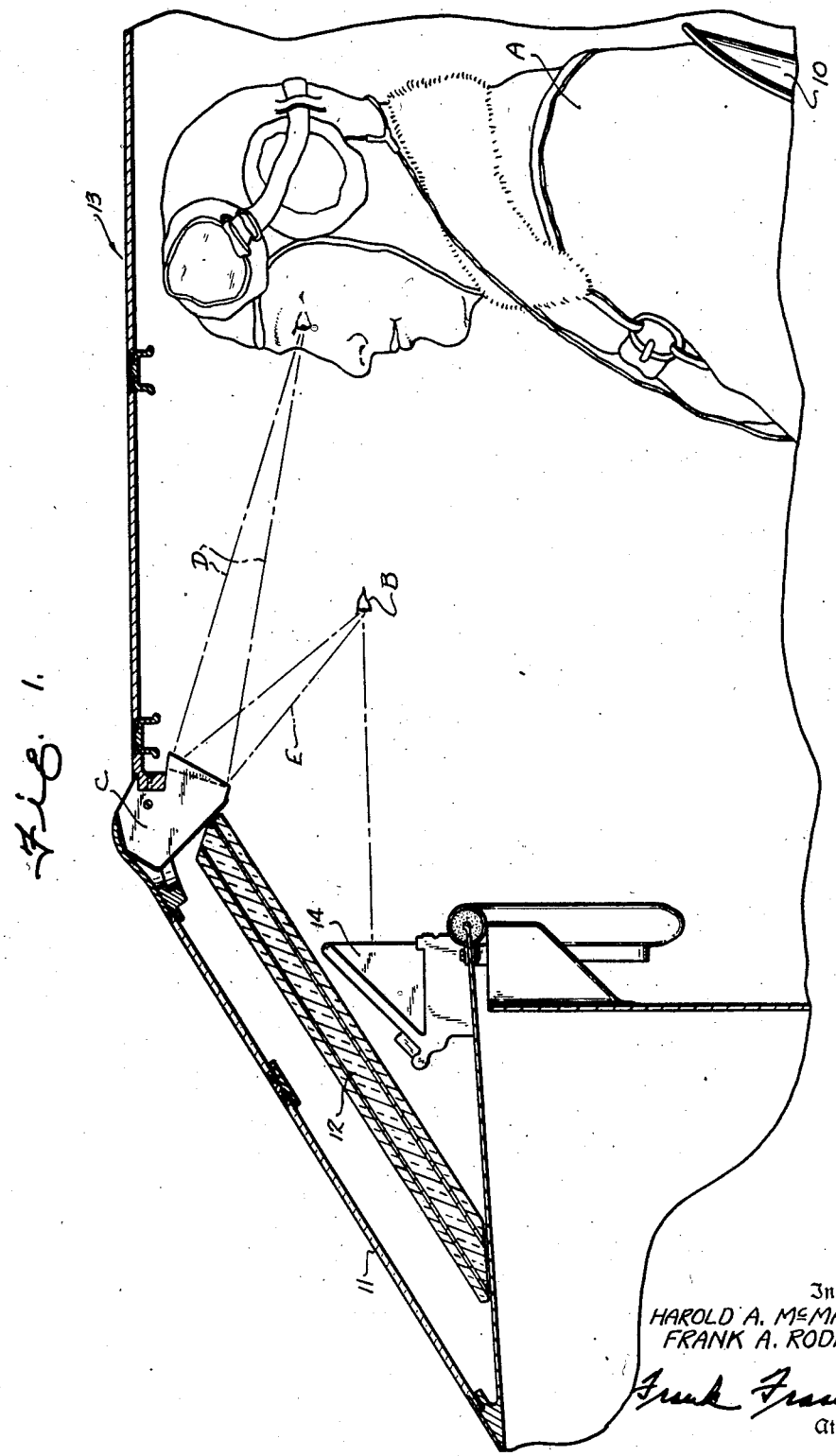
Inventors
HAROLD A. McMASTER.
FRANK A. RODMAN.
Attorney

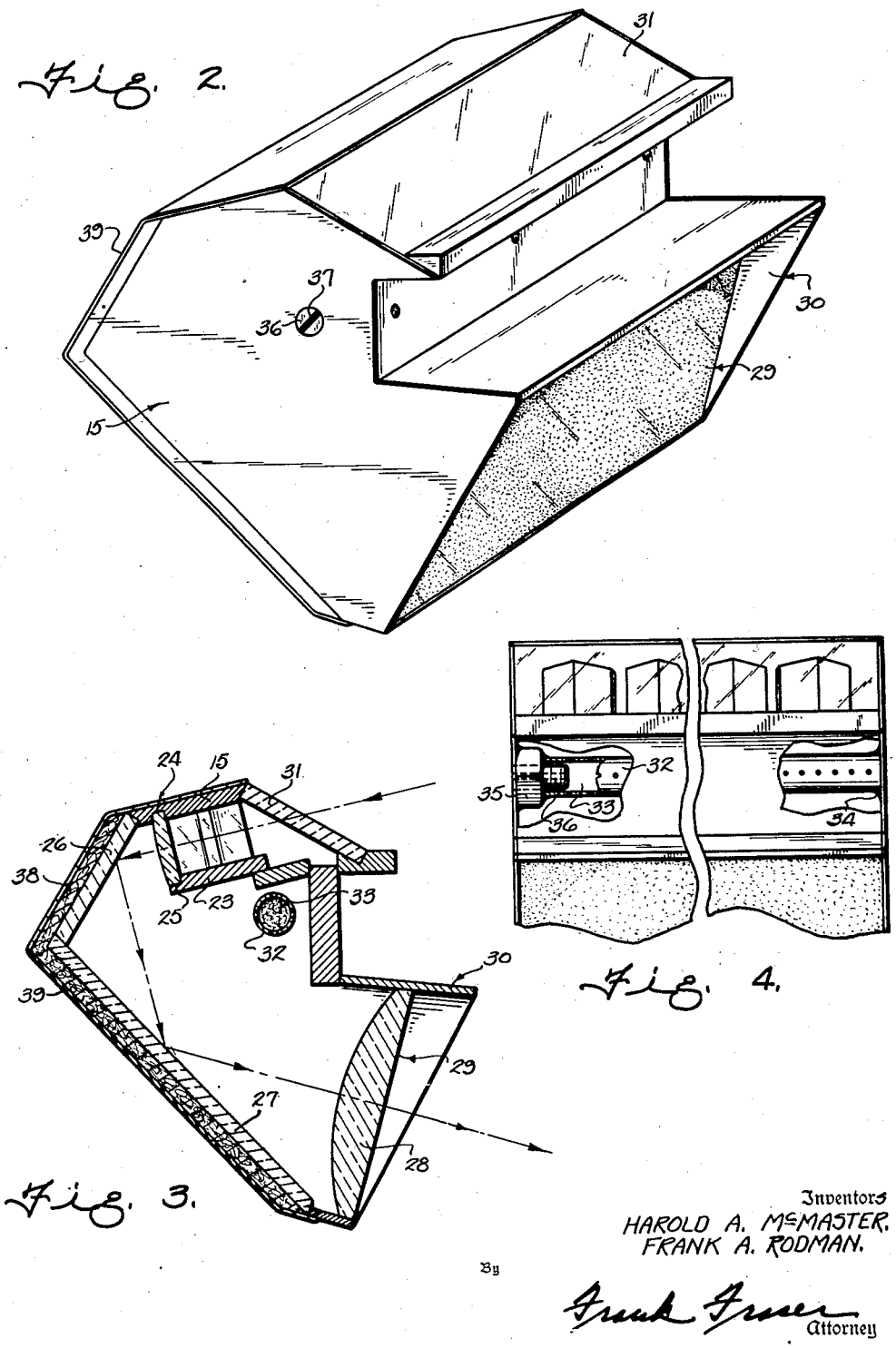

April 17, 1945.  H. A. McMASTER ET AL  2,374,027
REAR VISION OPTICAL INSTRUMENT
Filed Dec. 26, 1941   4 Sheets-Sheet 3

Inventors
HAROLD A. McMASTER.
FRANK A. RODMAN.
By Frank Fraser
Attorney

Patented Apr. 17, 1945

2,374,027

UNITED STATES PATENT OFFICE 2,374,027

REAR-VISION OPTICAL INSTRUMENT

Harold A. McMaster and Frank A. Rodman, Toledo, Ohio, assignors to Libbey-Owens-Ford Glass Company, Toledo, Ohio, a corporation of Ohio Application December 26, 1941, Serial No. 424,429

7 Claims. (Cl. 88—72)

The present invention relates to an optical instrument and more particularly to a device intended for rear vision purposes.

Primarily, the instrument has been designed for use in aircraft and mobile land vehicles and is adapted to be mounted in proximity to an occupant so that he may be able to get the benefit of rear vision over a predetermined field by merely glancing at the view-screen of said instrument placed before him, without the necessity of adjustment or focusing.

In aircraft and, for example, in a single occupant ship, the pilot quite often has practically unobstructed vision to the front overhead and to both sides but no means for rear vision except insofar as he may be able to turn his head for the purpose. However, during wartime when the pilot not only has to handle the ship but also a gun, it will obviously be advantageous if he can quickly and easily survey the situation to the rear of his ship.

In accordance with the present invention, a rear vision device or periscope is provided and so designed and constructed as to give a properly oriented image on a view-screen. Further, when in a plane and properly mounted, the device is such that the view-screen can be seen by the pilot from any of the positions he normally assumes in the pilot's seat during maneuvering of his ship. The main purpose of our invention is to provide a rear vision periscope in which a satisfactory image is properly oriented both as to top and bottom and from right to left, so that in the event of enemy craft to the rear of his ship, the pilot will know immediately without calculation the location thereof and can maneuver his own ship accordingly. However, in those cases where lateral reversal of the image can be tolerated, the optical system can be simplified and cheapened somewhat to give an image which is properly oriented from top to bottom but laterally reversed.

Other objects and advantages of the invention will become more apparent during the course of the following description when taken in connection with the accompanying drawings.

In the drawings wherein like numerals are employed to designate like parts throughout the same;

Fig. 1 is a fragmentary vertical longitudinal section through one form of aircraft in which the instrument may be mounted, showing the relative position of a pilot with respect thereto;

Fig. 2 is a perspective view of an instrument made in accordance with our invention;

Fig. 3 is a vertical transverse section therethrough;

Fig. 4 is a fragmentary elevation of the instrument partly in section for purposes of illustration;

Figure 5:
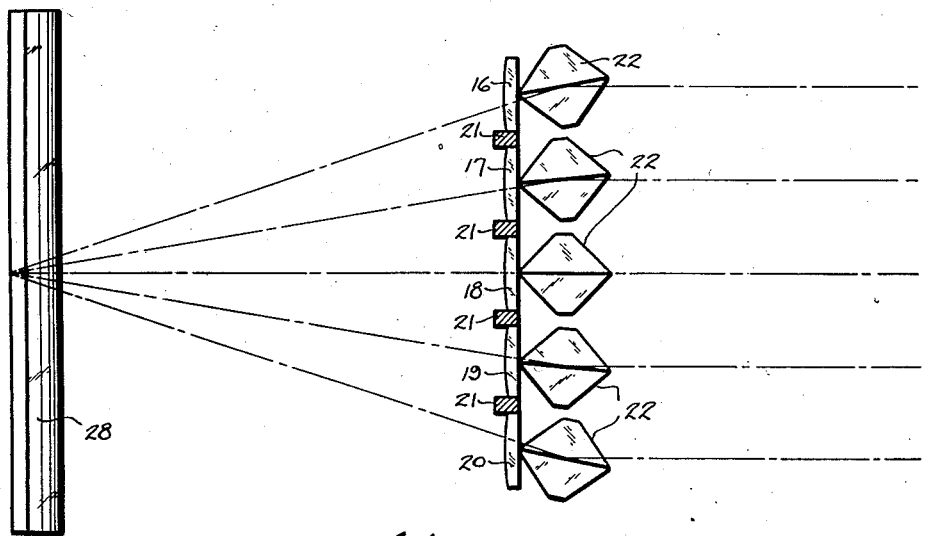
Fig. 5 is a diagrammatic plan view of a part of the optical system.

Referring first to Fig. 1, which will be understood to be purely diagrammatic and illustrative of only one application of the device, in this case a single seated fighter plane, the pilot A is seated in the pilot's seat 10. The windshield is indicated by the numeral 11 and between the windshield and pilot is shown a bullet-resistant laminated glass shield 12. The canopy of the ship is indicated generally by the numeral 13, and in this type of ship the canopy is fundamentally a glazed opening to give the pilot a maximum of vision to the front, to the sides, and overhead. An illuminated gun sight is illustrated diagrammatically and indicated by the numeral 14. The letter B is employed to designate the approximate position of the pilot's eyes when examining the gun sight 14, and it is an important feature of our rear vision periscope that the pilot may use it not only when in his normal position in the seat but also when he moves forward to examine the gun sight or any of the other positions which the pilot must assume during handling of his plane in ordinary flight and when in combat. The broken lines D in Fig. 1 show how readily the pilot can see the view-screen when in one position, while the broken lines E show that he can still see the screen when moved far forward to use the gun sight, and as is explained hereinafter, the view-screen itself is so made that the image thereon can be seen from these various positions.

Our rear vision periscope is indicated in its entirety by the letter C in Fig. 1. It will be noted that the periscope is mounted in such a way as to not substantially interfere with the streamlining of the ship and is disposed approximately at the juncture of the windshield and top of the canopy. In our preferred embodiment, a plurality of objective collecting devices are employed in lieu of a single collecting lens. Obviously, the value of a rear vision instrument is dependent not only upon the ease of image inspection but also upon the range of field covered, lack of distortion, and brilliancy or clarity of image produced. Thus, the range of field covered with any given instrument is handled by a plurality of collecting devices so designed, mounted, and oriented as to superimpose the various images to produce a single, continuous, sharply defined image free of boundary lines, objectionable overlap, or distortion. That is, there is no double image or breaks in the image produced.

By means of suitable reflecting devices properly associated, the superimposed images are reflected as a single image upon a view-screen. An important feature of the instrument is a view-screen having a translucent surface giving a clear, sharp image which is of substantially uniform intensity over the entire area of the screen and for all practical purposes such as not to result in objectionable reflection of direct light.

Our periscope is further provided with breather means so that the instrument will not be injured or otherwise adversely affected when undergoing varying barometric pressures as are encountered when ships fly at different altitudes. The breather device includes dehydrating and filtering means so that moisture and other foreign matter will not be permitted to enter within the instrument.

With further reference to Figs. 2 to 7 inclusive, the periscope shown has a casing 15 which may be of metal, plastic, or other materials capable of withstanding the necessary shocks, temperature changes, vibration, etc. For example, the construction of the instrument as a whole for use in an airplane need not ordinarily be as rugged as when used in a tank, but obviously the selection of materials and matters of this kind can be altered to meet particular needs.

In the particular instrument illustrated in these figures, five objective lens systems are used. Without of course being restricted to exact sizes of lenses and with the further explanation that the optical system can be varied from that shown to cover a greater or lesser field either horizontally or vertically, or both, and that these factors are also influenced by the maximum over-all dimensions for the instrument permissible in any given installation, the system shown includes five 10 diopter plano-convex lenses indicated by the numerals 16, 17, 18, 19 and 20. In a number of instruments made by us, these lenses measured approximately one-half inch by five-eighths inch and were about one-eighth inch thick at the center. All five of the lenses are mounted with their plano faces in a common plane and adjacent lenses are separated by non-reflecting, opaque strips 21.

To prevent difficulty from stray light, it is of course preferred that all interior parts of the instrument except the lenses and mirrors be non-reflecting and, if necessary, the surfaces may be coated with flat black paint.

Figure 7:
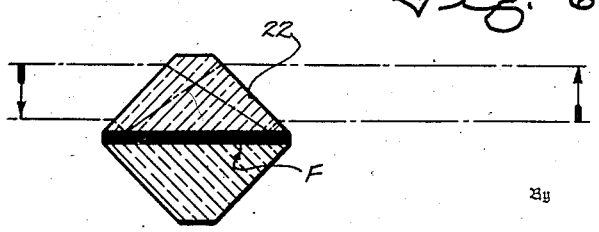
Fig. 7 is an enlarged sectional view of a cubical prism employed in the preferred system.
Figure 8:
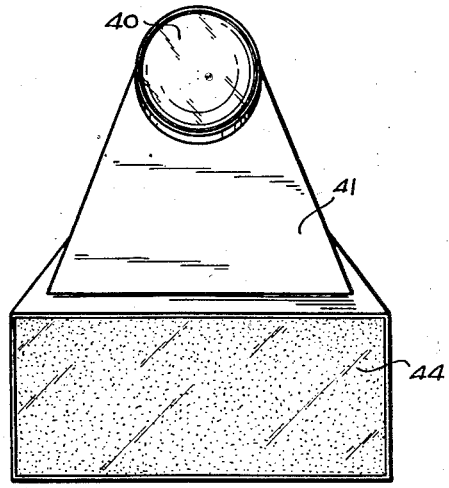
Fig. 8 is a front elevation of a modified instrument.

Immediately in front of each of the lenses 16 to 20 is mounted a half inch cubical prism 22. These prisms are split along one diagonal and, as indicated in Fig. 7 by the letter F, are silvered and lacquered at their interfaces. The lacquer used by us to protect the silver films was black, but any other proper material can be used for this purpose.

As shown in Fig. 3, the lenses 16 to 20 and prisms 22 are mounted between the plate 23 and the casing 15. When positioning the prisms, set screws (not shown) are used to frictionally hold or clamp them in place between the plate 23 and the casing. When properly positioned, which means the necessary orientation to give the desired superimposed position of all of the images, the prisms are then cemented permanently into place.

The plano-convex lenses are also permanently cemented in place and, as shown, the casing 15 has a groove 24 adapted to receive one edge of the lens while the opposite edge is seated in the reduced end 25 of the plate 23. In addition to the cementing agent, the seats for the lenses may be provided with felt, cork, or other gasket and cushioning means. This is also true for the cubical prisms in that satisfactory cushioning layers can be placed between the frame parts and the edges of the prisms, and all of the parts securely cemented against accidental displacement.

Fig. 3 shows the interior of the instrument clearly, and it will be observed that a mirror 26 is mounted within the casing to reflect the rays of light passing through the lens systems just described. In the particular design of instrument illustrated, where the periscope is to be mounted approximately as shown in Fig. 1, the mirror 26 is placed at an angle of 45 degrees to the axis of the several lens systems. A second mirror 27 is arranged as shown in Fig. 3, the two mirrors being cemented or clamped into position and held against accidental displacement. The most effective type of mirror for the purpose is a front surface mirror of evaporated aluminum, such mirrors and the manufacture thereof being well known.

The view-screen of the instrument shown in Fig. 3 is designated by the numeral 28 and is in the form of a plano-cylindrical lens whose axis is horizontal. In one style of periscope which we have produced, a ten diopter plano-cylindrical lens was employed. The exterior surface 29 of this lens is given what may be termed a matte finish such as by sandblasting, grinding with abrasive material, or by acid etch treatment. It has been found that best results are obtained if the finish is a mild one sufficient to kill the polish and to reduce to a minimum reflection of direct light, without being coarse or deeply pitted. The casing is preferably extended beyond the surface 29 of the lens in a manner to produce a light shield or hood 30, intended primarily to protect the view-screen from excessive direct light.

As will be apparent, the more completely the view-screen is shielded from direct light, the easier it will be to see the image, but our design of instrument does have the definite advantage that even when the view-screen is not shielded at all, the observer can see a well defined image on the view-screen if he is reasonably close to it and in a position where he can see the entire screen.

To protect the objective lenses, a cover plate 31 is used and as shown in Fig. 3 is disposed at an angle for purposes of streamlining, and reference to Fig. 1 will show how well this is done. On the other hand, the cover plate is not a part of the optical system and can be mounted at right angles to the axis of the objective lenses which will give some gain in light transmission. When the instrument casing and parts are assembled, they should of course be cleaned and made to fit together tightly, and preferably all exterior joints are carefully cemented and sealed to prevent leakage of dust, moisture, etc. However, as a periscope of this kind used in aircraft will be subjected to varying altitudes, it is important that the instrument be vented to the outside. Toward this end, we provide the instrument with a self-contained dehydrating cartridge 32 which is in the form of a perforated tube adapted to contain a dehydrating agent 33 such as calcium chloride or other commonly used dehydrating agents. The tube may be soldered or otherwise held in place at one end as at 34, and the opposite end is mounted upon the threaded sleeve 35 having a removable plug 36 provided with a relatively small vent 37 therethrough. The plug can be removed to permit removal and replacement of the dehydrating material. The use of a restricted aperture is desirable because it prevents excessive movement of air through the instrument but does allow for sufficient breathing to prevent dangerous pressures or lack of pressure within the instrument. As shown, the location of the breather tube is such as not to in any way interfere with the optical system.

All or part of the casing, mirrors, and other parts of the periscope may be protected with insulation 38 and an external covering 39, or any desired reinforcing structure.

Figure 6:
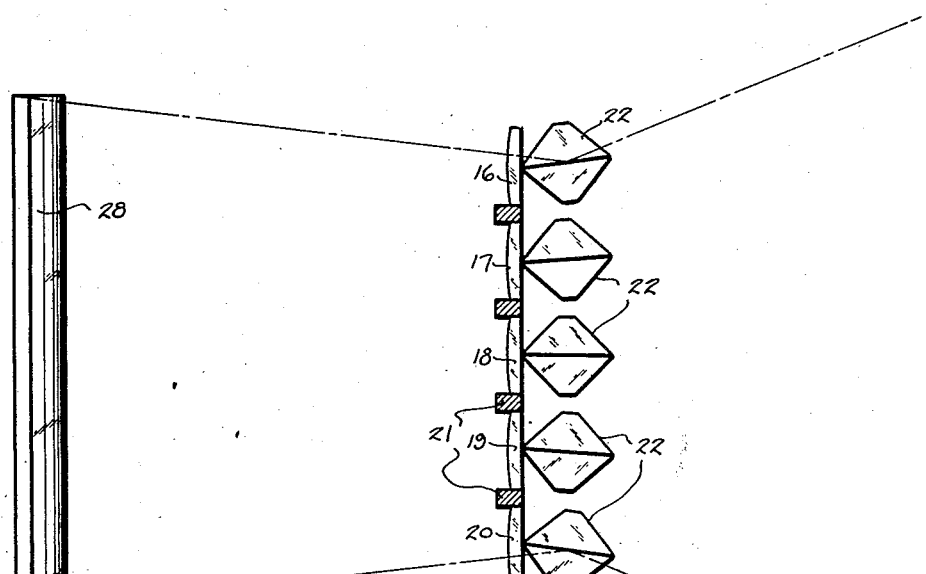
Fig. 6 is similar to Fig. 5, illustrating the longitudinal field of the particular system illustrated.

Figs. 5 and 6 show diagrammatically the superimposing of the plurality of images and the horizontal range of field covered. Fig. 5 illustrates how parallel light from a distant point is caused to converge at a single point on the view-screen. Assuming that in Fig. 5, only the plano-convex lenses were used, then light from a distant object would pass through each of the five lenses and form five separate images side by side on the view-screen, and said images would be reversed from right and left. However, when the prisms are placed before the lenses and inclined to the axes of the lenses as indicated in Fig. 5, the prisms cause the images to be superimposed and appear as a single image and also right and left hand relations are preserved.

Fig. 7 illustrates diagrammatically how light entering one of the prisms will be refracted at the first surface and reflected once from the silvered diagonal, then again refracted at the second surface resulting in reversal of the image but giving no dispersion or color.

Advantage is taken of this single reflection to redirect the light rays so that the images will be superimposed. The brilliancy of the final single image is enhanced by superimposing the plurality of images of the several lenses. Advantage is also taken of this fact to keep the aperture of each lens small so that a simple lens may be used. Fig. 6 shows the horizontal field covered by an arrangement of five prisms and five plano-convex lenses. The angle so covered could be increased by increasing the number of lenses and prisms, and in fact can be carried to the point when a panorama of 180 degrees could be viewed on a single flat view plate. The vertical field, however, would be no greater than that which a single lens would cover. Due to the small aperture of the individual lenses, the vertical angle may be 45 degrees for a simple lens or greater still for a corrected lens.

The image formed by an arrangement as shown in Figs. 5 and 6 would be inverted, but in the actual instrument two mirrors are placed in the light path to reinvert the image or make it erect. The final image, as seen on the view-screen, is then oriented in a similar manner to that in the conventional automobile rear-view mirror. The view-screen is made in the form of a cylindrical lens so that the row of small objective lenses will appear to cover the whole screen and illuminate it uniformly. Were it not for the matte finish on the plano surface of this cylindrical lens, it would be necessary for the observer to place his eyes directly on the axis of the system before he could see the image formed by the system, and any slight displacement therefrom would result in his losing the view. When the plano surface of the cylindrical lens has a matte finish, however, and the image is sharply focused thereon, the light is diffused throughout a considerable angle and the image is visible throughout a hemisphere of 180 degrees in all directions, although the brilliancy diminishes as the observer departs substantially from the axis of the system. If the matte finish is coarse, brilliancy of the image suffers but is more readily discernible over a wider range while, on the other hand, if the finish is fine the image will have a higher degree of brilliance when viewed on the axis but will not be as readily discernible over as wide a field. In practice, we have used an intermediate matte finish to get satisfactory brilliance in a relatively wide angle of viewing positions.

Figure 9:
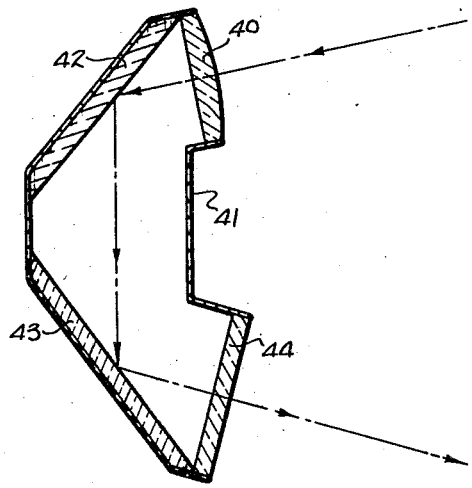
Fig. 9 is a vertical transverse section through the device shown in Fig. 8.

In the simple form indicated in Fig. 9, no prisms are used and the image formed by the single lens is erect but has right and left hand reversed. The angular size of the field covered by such a periscope is limited to that covered by a single lens. The lens 40 is mounted in the casing 41 within which the mirrors 42 and 43 are positioned to reflect the image upon the view-screen 44. The screen illustrated is also of a simplified nature, being a flat sheet of glass whose outer surface is provided with a matte finish similar to the surface 29 of the lens 28. Obviously, the flat view-screen can be used in lieu of the lens in either construction, or vice-versa.

We contemplate the treatment of the lenses used in the systems to reduce glare or, stated differently, to increase light transmission. For example, the surfaces of the lenses may be given a light etch or base coatings applied thereon capable of increasing the light transmission of the parts without interfering with the optical properties thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. An optical instrument of the class described comprising a view-screen, a plurality of objective collecting lenses each of which includes a prism having a light reflecting diagonal, and reflecting means for directing light rays passing through said objective lenses upon the view-screen, the objective lenses being so positioned that a single image is formed upon the view-screen.

2. An optical instrument of the class described comprising a view-screen having a matte finish surface through which light may pass, a plurality of objective lenses each of which includes a cubical prism having a light reflecting diagonal, and a plurality of reflecting means for directing light rays passing through said objective lenses upon the matte finish surface of the view-screen to produce a properly oriented image thereon, said objective lenses being so positioned that a single image is formed upon the view-screen.

3. An optical instrument of the class described comprising a translucent view-screen, a plurality of objective lenses each of which comprises a plano-convex lens and a cubical prism split along one diagonal, and a plurality of reflecting means for directing light rays passing through said objective lenses upon the view-screen where a single properly oriented image is produced.

4. An optical instrument of the class described comprising a plano-cylindrical lens having a horizontal axis, the plano surface being arranged to the exterior of the instrument and having a matte finish surface through which light may pass, a plurality of objective lenses each of which comprises a plano-convex lens and a cubical prism having a light reflecting diagonal, the axis of the plano-cylindrical lens being different from that of the objective lenses, and a pair of light reflecting plates for directing the light rays passing through said objective lenses upon the matte finish surface of the plano-cylindrical lens to produce a single, properly oriented image thereon.

5. An optical instrument of the class described comprising a view-screen having a matte finish surface through which light rays may pass, a plurality of spaced objective lenses each of which comprises a plano-convex lens and a cubical prism having a light reflecting diagonal, the plano surfaces of the plano-convex lenses of said objectives being disposed in a common plane, the cubical prisms being inclined to the axes of said plano-convex lenses to cause the plurality of images produced by said objectives to be superimposed and appear as a single image upon the view-screen.

6. An optical instrument of the class described comprising a view-screen having a matte finish surface through which light rays may pass, a plurality of spaced objective lenses each of which comprises a plano-convex lens and a cubical prism having a light reflecting diagonal, the plano surfaces of the plano-convex lenses of said objectives being disposed in a common plane, the cubical prisms being inclined to the axes of said plano-convex lenses to cause the plurality of images produced by said objectives to be superimposed and appear as a single image upon the view-screen, and an opaque separator disposed between adjacent objective lenses.

7. An optical instrument of the class described comprising a view-screen having a matte finish surface through which light rays may pass, a plurality of spaced objective lenses each of which comprises a plano-convex lens and a cubical prism having a light reflecting diagonal, the plano surfaces of the plano-convex lenses of said objectives being disposed in a common plane, the cubical prisms being inclined to the axes of said plano-convex lenses to cause the plurality of images produced by said objectives to be superimposed and appear as a single image upon the view-screen, an opaque separator disposed between adjacent objective lenses, and means between the objective lenses and view-screen for re-inverting the images formed by the objective lenses so that the continuous image on the view-screen will be correct as to top and bottom and from right to left.

HAROLD A. McMASTER.
FRANK A. RODMAN.